(12) United States Patent
Magaña et al.

(10) Patent No.: US 10,278,490 B1
(45) Date of Patent: May 7, 2019

(54) PORTABLE TABLE ASSEMBLY

(71) Applicant: Brian E. Magaña, Lakewood, CO (US)

(72) Inventors: Tony P. Magaña, Lakewood, CO (US); Brian E. Magaña, Lakewood, CO (US)

(*) Notice: Subject to any disclaimer, the term of this patent is extended or adjusted under 35 U.S.C. 154(b) by 0 days.

(21) Appl. No.: 15/926,730

(22) Filed: Mar. 20, 2018

(51) Int. Cl.
*A47B 3/06* (2006.01)
*A47B 13/08* (2006.01)
*A47B 13/04* (2006.01)
*B27M 3/18* (2006.01)
*F16B 5/00* (2006.01)
*A47B 37/04* (2006.01)

(52) U.S. Cl.
CPC ............ *A47B 3/06* (2013.01); *A47B 13/04* (2013.01); *A47B 13/088* (2013.01); *B27M 3/18* (2013.01); *F16B 5/002* (2013.01); *A47B 37/04* (2013.01)

(58) Field of Classification Search
CPC ... A47B 3/06; A47B 3/083; A47B 2220/0086; A47B 2220/0083
USPC .............. 108/165, 166, 167, 180, 157.14; 312/108, 259, 260
See application file for complete search history.

(56) References Cited

U.S. PATENT DOCUMENTS

| | | | |
|---|---|---|---|
| 1,251,661 A | 1/1918 | Hendershott | |
| 1,645,336 A | 5/1926 | McGlothern | |
| 1,776,071 A * | 9/1930 | Horwath | A47F 5/112 |
| | | | 108/157.14 |
| 2,481,671 A * | 9/1949 | John | A47B 3/06 |
| | | | 108/101 |
| 3,438,345 A * | 4/1969 | Otey | A47B 3/00 |
| | | | 108/115 |
| 4,102,555 A * | 7/1978 | Tobolski | B25H 1/04 |
| | | | 108/166 |
| 4,126,363 A * | 11/1978 | Peets | D05B 75/02 |
| | | | 108/166 |
| 4,191,113 A | 3/1980 | Hogberg | |
| 4,632,040 A * | 12/1986 | Sheffer | A47B 3/00 |
| | | | 108/157.14 |
| 4,740,032 A * | 4/1988 | Olsen | A47B 3/06 |
| | | | 108/159 |
| 4,765,253 A * | 8/1988 | Schappach | A47B 3/06 |
| | | | 108/158.12 |
| 4,834,450 A | 5/1989 | Stickler | |
| 4,881,779 A * | 11/1989 | Bubien | A47C 4/021 |
| | | | 297/440.13 |
| 5,367,964 A * | 11/1994 | Hockensmith | A47B 3/14 |
| | | | 108/180 |
| 5,644,995 A | 7/1997 | Gurwell et al. | |

(Continued)

FOREIGN PATENT DOCUMENTS

| | | |
|---|---|---|
| GB | 9820483.7 A | 5/2000 |
| WO | 2006132499 A1 | 12/2006 |

*Primary Examiner* — Jose V Chen
(74) *Attorney, Agent, or Firm* — Williams Intellectual Property; Timothy Snyder (57) ABSTRACT

A portable table assembly for indoor and outdoor use is provided herein. The portable table assembly includes a half-wise foldable tabletop, three elongated horizontal rails, and a pair of parallel spaced end panels. The three elongated rails form slotted joints with the pair of parallel spaced end panels such that the rails traverse between and connect the pair of end panels. The tabletop rests atop the pair of end panels and two of the elongated rails to complete the portable table assembly. A do-it-yourself method and kit for manufacturing the portable tabletop assembly is also provided herein.

19 Claims, 6 Drawing Sheets

(56) References Cited

U.S. PATENT DOCUMENTS

| | | | | |
|---|---|---|---|---|
| 5,794,546 | A | * 8/1998 | Carter | A47B 3/12 |
| | | | | 108/115 |
| 6,267,065 | B1 | 7/2001 | Lin | |
| 6,619,601 | B1 | * 9/2003 | Vall | A47B 13/02 |
| | | | | 108/158.12 |
| 6,659,022 | B1 | * 12/2003 | Holtz | A47B 3/06 |
| | | | | 108/158.12 |
| 6,769,369 | B1 | 8/2004 | Brandenberg | |
| 6,807,912 | B2 | 10/2004 | Willy | |
| 7,516,708 | B2 | * 4/2009 | Willy | A47B 3/06 |
| | | | | 108/153.1 |
| 8,020,497 | B2 | * 9/2011 | Ossorguine | A47B 87/02 |
| | | | | 108/157.14 |
| 2002/0069797 | A1 | * 6/2002 | Case, Jr. | A47B 3/14 |
| | | | | 108/157.18 |
| 2003/0205180 | A1 | 11/2003 | Bishop | |
| 2004/0089208 | A1 | * 5/2004 | Zheng | A47B 43/02 |
| | | | | 108/165 |
| 2008/0245277 | A1 | 10/2008 | Willy et al. | |
| 2012/0279428 | A1 | 11/2012 | Brandenberg | |
| 2013/0019453 | A1 | 1/2013 | Berent | |
| 2014/0165289 | A1 | * 6/2014 | Trocchia | A47D 1/006 |
| | | | | 5/131 |
| 2018/0020822 | A1 | 1/2018 | Miller et al. | |

\* cited by examiner

PORTABLE TABLE ASSEMBLY

BACKGROUND OF THE INVENTION

Various types of portable tables are known in the prior art. For example, many portable picnic tables include a foldable tabletop where the feet retract into and deploy out of the under surface of the tabletop. These portable tables typically have tabletops made of a molded plastic with the under surface and legs incorporating several mechanisms and mechanical hardware (e.g., pivot points, joints) to permit the legs to deploy and retract. As these tables are conveniently portable, the mechanisms and mechanical hardware can make the deployment of the legs difficult and can pinch one's fingers during set-up. The tables are also prone to wear and tear and premature failure due to the complex assemblies and multiple hardware parts. Additionally, due to the materials, mechanisms, and mechanical hardware to make these tables, the cost is higher than one might expect. Costs are further added since only a manufacturer with the proper tooling can assemble these tables.

Other portable and collapsible tables are also well known in the art. However, what is needed is a portable table assembly that is conveniently portable, easy to assemble and disassemble with minimal hardware, stable, and in some instances capable of being built from scratch using a minimal amount of materials and minimal skill.

FIELD OF THE INVENTION

The present invention relates to a portable table assembly, a kit, and a method of manufacture thereof, and more particularly, to a portable table assembly having a plurality of components with slotted features that assemble to form a unique and stable table for indoor and outdoor use.

SUMMARY OF THE INVENTION

The general purpose of the portable table assembly, described subsequently in greater detail, is to provide a portable table assembly which has many novel features that result in a portable table assembly which is not anticipated, rendered obvious, suggested, or even implied by prior art, either alone or in combination thereof.

A portable table assembly for indoor and outdoor use is provided herein. The portable table assembly includes a half-wise foldable tabletop, a first elongated horizontal rail, a second elongated horizontal rail, and a third elongated horizontal rail, and a pair of parallel spaced end panels. Each elongated rail includes a down-vertical notch positioned at opposing ends of the elongated rails. Each end panel is in the form of a planar body having a top edge, where each top edge includes two up-vertical notches positioned symmetrically about a central-vertical axis of the end panels, and a closed vertical slot positioned within the body along the central-vertical axes. For assembly, the down-vertical notches on the first elongated rail and second elongated rail interlock with the two up-vertical notches on the top edges of the end panels such that the first elongated rail and second elongated rail horizontally traverse between and connect the pair of end panels. The down-vertical notches of the third elongated rail interlocks with the closed vertical slots of the end panels such that the third rail horizontally traverses between and further connects and stabilizes the pair of parallel spaced end panels. The half-wise foldable tabletop rests atop at least one of the top edges of the end panels and a top surface of the first rail and the second rail to complete the portable table assembly.

Each elongated horizontal rail of the table assembly may include a first horizontal half portion connected to a second horizontal half portion by a hinge to permit the elongated rails to half-wise fold for storage and deploy for assembly. Each hinge connecting the first horizontal portion and second horizontal portion of each rail is assembled thereto by a first set of fastening elements. Each elongated horizontal rail may further include a disengageable reinforcement positioned on an opposing side of the rail relative to the hinge. The reinforcement, in an engaged state, reinforces the rail when the rail is in a deployed state for assembly, and in a disengaged state when the rail is to be half-wise folded for storage/transport.

The portable table assembly is preferably made primarily of wood due to the availability, durability, recyclability, and aesthetic appeal of wood.

A method of manufacturing the parts of the tabletop assembly is also provided herein. The method includes providing a single sheet of material and one or more template guides having guide features with a geometry and dimensions that correspond to the dimensions and geometry of the tabletop, the elongated rails, and the pair of end panels; marking an outline of the tabletop, the elongated rails, and the pair of end panels on the single sheet of material using the one or more template guides; cutting the tabletop, the elongated rails, and the end panels from the single sheet of material; and creating the up-vertical notches and the down-vertical notches.

A Do-It-Yourself kit for manufacturing the parts of the tabletop assembly is further provided herein. The kit includes: a template guide having guide features with geometries and dimensions that correspond to the dimensions and geometry of the tabletop, the elongated rails, and the pair of end panels; at least one hinge; a plurality of fastening elements; a carrying bag; and a set of instructions for creating the portable tabletop assembly.

Thus has been broadly outlined the more important features of the present portable table assembly so that the detailed description thereof that follows may be better understood and in order that the present contribution to the art may be better appreciated.

Objects of the present portable table assembly, along with various novel features that characterize the invention are particularly pointed out in the claims forming a part of this disclosure. For better understanding of the portable table assembly, its operating advantages and specific objects attained by its uses, refer to the accompanying drawings and description.

BRIEF DESCRIPTION OF THE DRAWINGS

In the figures, identical structures, element or parts that appear in more than one figure are generally labeled with a same numeral in all the figures in which they appear. Dimensions of components and features shown in the figure are generally chosen for convenience and clarity of presentation and are not necessarily shown to scale. The figures are listed below.

FIGURES

FIGS. 5A and 5B depict an example of a foldable elongated horizontal rail in accordance with embodiments of the invention, where FIG. 5A is a front elevation view thereof and FIG. 5B is a rear elevation view thereof.

DETAILED DESCRIPTION OF THE DRAWINGS

The present invention has utility as a portable table assembly that is conveniently portable, easy to assemble and disassemble with minimal hardware, stable when assembled, and in some instances capable of being built from scratch using a minimal amount of materials and minimal skill. The portable table assembly is useful for both indoor and outdoor use and for a myriad of different activities ranging from picnics to hosting special events. The following description of various embodiments of the invention is not intended to limit the invention to those specific embodiments, but rather to enable any person skilled in the art to make and use this invention through exemplary aspects thereof.

It is to be understood that in instances where a range of values are provided, or a ±deviation, that the range/deviation is intended to encompass not only the end point values of the range but also intermediate values of the range as explicitly being included within the range and varying by the last significant figure of that range. By way of example, a recited range of 1 to 4 is intended to include 1-2, 1-3, 2-4, 3-4, and 1-4. A recited deviation of 1.0±0.5 is intended to include 0.5-1.5, 0.5-1, and 1-1.5.

With reference now to the drawings, and in particular FIGS. 1 through 8 thereof, examples of the instant portable table assembly employing the principles and concepts of the present portable table assembly and generally designated by the reference number 10 will be described.

Figure 1A:
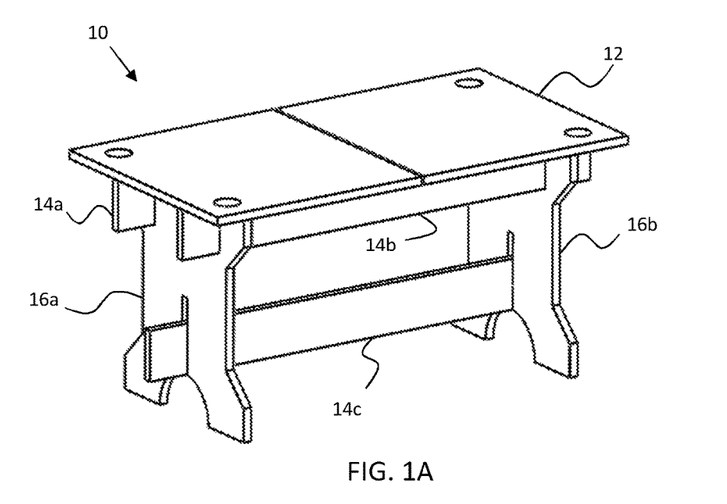
FIG. 1A is a perspective view of the portable table assembly in an assembled state in accordance with embodiments of the invention.
Figure 1B:
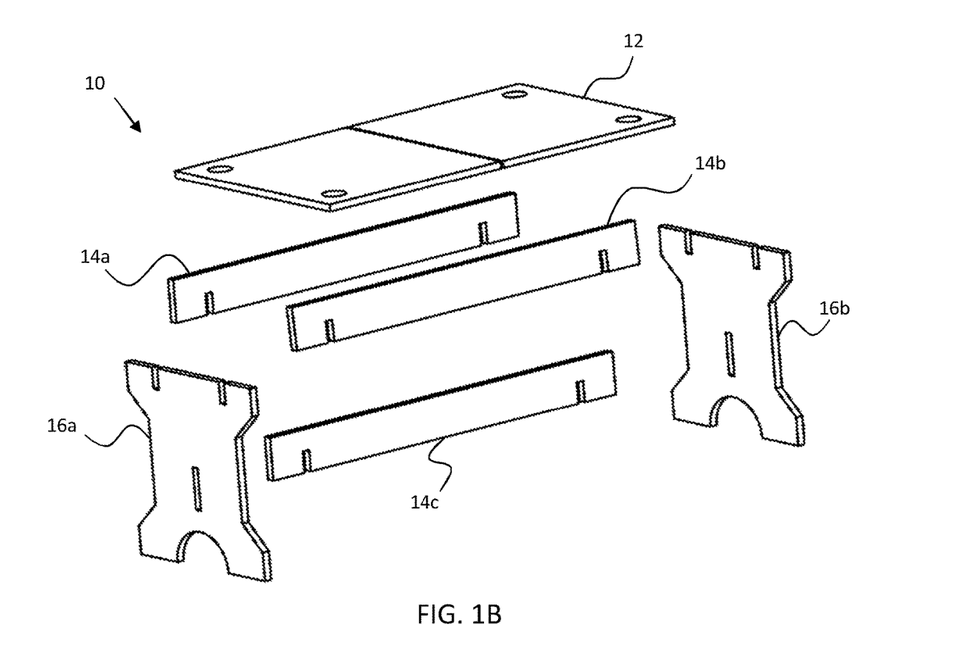
FIG. 1B is an exploded perspective view of the portable table assembly in accordance with embodiments of the invention.

With reference particularly to FIGS. 1A through 4, a specific embodiment of the present portable table assembly 10 is illustrated. FIG. 1A depicts a perspective view of the portable table assembly 10 in an assembled state and FIG. 1B depicts an exploded view of the portable table assembly 10. The portable table assembly 10 generally includes a tabletop 12, three elongated horizontal rails (14a, 14b, 14c), and a pair of parallel spaced end panels (16a, 16b). The tabletop 12, the three elongated horizontal rails (14a, 14b, 14c), and the pair of parallel spaced end panels (16a, 16b) all assemble together with minimal effort to form the portable table assembly 10 as further described below.

Figure 2A:
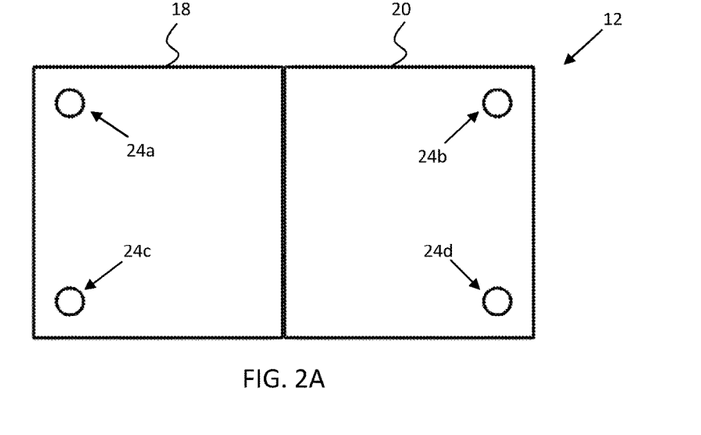
FIG. 2A is a top plan view of a half-wise foldable tabletop in accordance with embodiments of the invention.
Figure 2B:
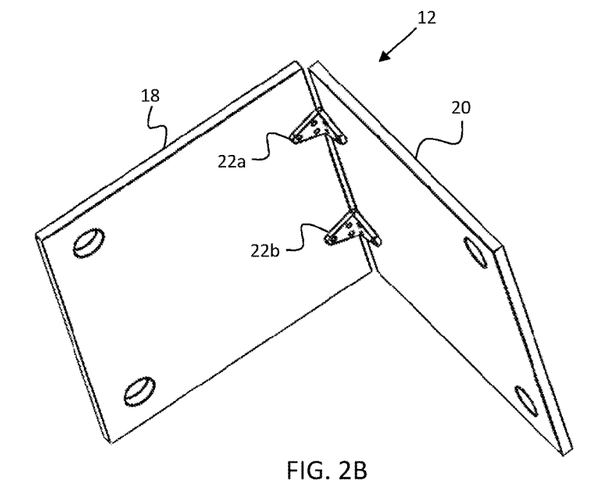
FIG. 2B is a bottom perspective view of the half-wise foldable tabletop shown in FIG. 2A in accordance with embodiments of the invention.

With reference to FIGS. 2A and 2B, a detailed view of the half-wise foldable tabletop 12 is shown, where FIG. 2A is a top plan view thereof and FIG. 2B is a bottom perspective view thereof of the tabletop 12 partially folded. In particular embodiments, the tabletop 12 includes a first half portion 18 and a second half portion 20 connected by one or more hinges (22a, 22b) to permit the tabletop 12 to half-wise fold for storage/transport and deploy for assembly. The one or more hinges (22a, 22b) may be strap hinges, piano hinges, or other known hinges in the art. The tabletop 12 is generally planar in shape having a length and width larger than its thickness. The tabletop 12 may be in the shape of a square, rectangle, circle, ellipse, or other known geometric or organic shape. In specific embodiments, the tabletop top 12 is in the form of a rectangle having a length of 69±1.0 inches and a width of 30±1.0 inches when the first half portion 18 and second half portion 20 are connected by the hinge(s) (22a, 22b). The tabletop 12 may further include one or more cup holders (24a, 24b, 24c, 24d). The cup holders (24a, 24b, 24c, 24d) may be in form of circular cutouts or circular indents created in the tabletop 12. It should be appreciated, that in some embodiments the tabletop 12 is not half-wise foldable but rather a single slab of material in the form of any of the aforementioned shapes. However, a half-wise foldable tabletop 12 is particularly advantageous as the overall size of the tabletop 12 can be reduced for storage and portability.

Figure 3:
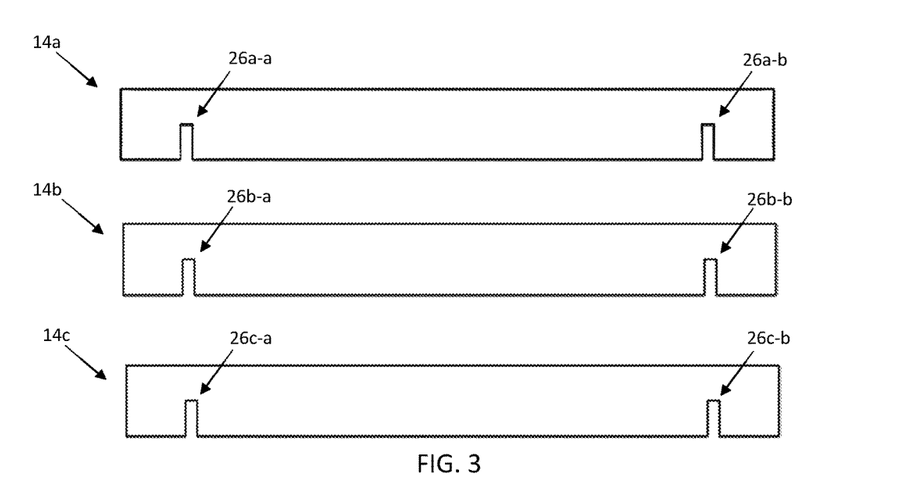
FIG. 3 depicts three elongated horizontal rails in accordance with embodiments of the invention.

With reference to FIG. 3, a first elongated horizontal rail 14a, a second elongated horizontal rail 14b, and third elongated horizontal rail 14c are shown. Each elongated rail (14a, 14b, 14c) includes a down-vertical notch (26a-a, 26a-b, 26b-a, 26b-b, 26c-a, 26c-b) positioned at opposing ends of the elongated rails (14a, 14b, 14c). In other words, each elongated rail (14a, 14b, 14c) includes a first end portion and an opposing end portion, where the first end portion includes a first down-vertical notch (26a-a, 26b-a, 26c-a) and the opposing end portion includes a second down-vertical notch (26a-b, 26b-b, 26c-b). As used herein, the vertical direction refers to a direction extending from the ground to the tabletop 12 when the portable table assembly 10 is in an assembled state. The term "down-vertical notch" therefore refers to a notch having an opening to the surroundings that is facing towards the ground; while an "up-vertical notch" refers to a notch having an opening to the surroundings that is facing towards the tabletop 12. The elongated horizontal rails (14a, 14b, 14c) are elongated in that the length of each rail (14a, 14b, 14c) is larger than the width. The elongated horizontal rails (14a, 14b, 14c) are further described as horizontal because the longitudinal axis of each rail (14a, 14b, 14c) is situated perpendicular to the vertical direction when the portable table assembly 10 is in an assembled state. In particular embodiments, the first rail 14a, second rail 14b, and third rail 14c all have substantially the same dimensions and geometry, which is advantageous from a manufacturing and assembly perspective. Each rail may have a length of 53±1.0 inches and a width of 6.0±1.0 inches, where each notch (26a-a, 26a-b, 26b-a, 26b-b, 26c-a, 26c-b) has a vertical dimension of 3.0±1.0 inches.

Figure 4:
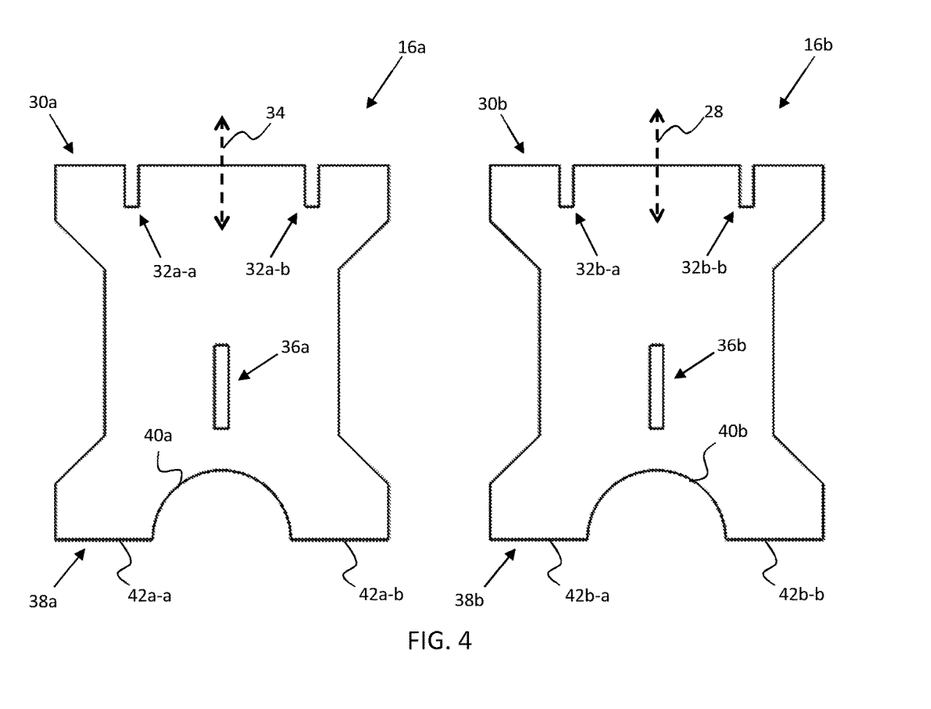
FIG. 4 depicts a pair of end panels in accordance with embodiments of the invention.

With reference to FIG. 4, the pair of end panels (16a, 16b) are shown in more detail. The pair of end panels (16a, 16b) are generally in the form of planar bodies, meaning the length and width are much larger than the thickness. Each end panel (16a, 16b) includes a top edge (30a, 30b). Each top edge (30a, 30b) includes two up-vertical notches (32a-a, 32*a-b*, 32*b-a*, 32*b-b*) positioned symmetrically about a central-vertical axis 34 (as denoted by the dashed arrow line) of the end panels (16*a*, 16*b*). In other words, each end panel (16*a*, 16*b*) includes a first notch (32*a-a*, 32*b-a*) positioned on the top edge (30*a*, 30*b*) at a first distance from the central-vertical axis 34, and a second notch (32*a-b*, 32*b-b*) positioned on the top edge (30*a*, 30*b*) at a second distance from the central vertical axis 34, where the first distance and second distance are the same. The up-vertical notches (32*a-a*, 32*a-b*, 32*b-a*, 32*b-b*) have their openings to the surroundings facing towards the tabletop 12 when the table assembly 10 is in an assembled state. Each end panel (16*a*, 16*b*) further includes a closed vertical slot (36*a*, 36*b*) situated within and therethrough the body of the end-panels (16*a*, 16*b*). The closed vertical slots (36*a*, 36*b*) are positioned along the central-vertical axis 34 a set distance below the top edges (30*a*, 30*b*) of the end panels (16*a*, 16*b*). The closed slots (36*a*, 36*b*) are deemed 'closed' because the perimeter of the slots (36*a*, 36*b*) are closed to the surrounding environment, in contrast to the notches described herein which have at least one side of their perimeter open to the surroundings. In particular embodiments, the closed vertical slots (36*a*, 36*b*) have a vertical dimension that is at least twice as large as the up-vertical notches (32*a-a*, 32*a-b*, 32*b-a*, 32*b-b*) on the top edges (30*a*, 30*b*). In some embodiments, the closed vertical slot has a vertical dimension of 6.0±1.0 inches and the up-vertical notches (32*a-a*, 32*a-b*, 32*b-a*, 32*b-b*) have a vertical dimension of 3.0±1.0 inches. In specific embodiments, the dimensions of each end panel (16*a*, 16*b*) are 24.0±1.0 inches wide and 27±1.0 in length. Each end panel (16*a*, 16*b*) further includes a foot edge (38*a*, 38*b*) that opposes the top edges (30*a*, 30*b*). In one embodiment, the foot edges (38*a*, 38*b*) are continuous along the entire width (length being in the vertical direction) of the end panels (16*a*, 16*b*). In other embodiments, each foot edge (38*a*, 38*b*) includes a semi-circular cutout (40*a*, 40*b*), the center of the semi-circular cutout (40*a*, 40*b*) being positioned along the central-vertical axis 34 so as to create a first foot edge (42*a-a*, 42*b-a*) and a second foot edge (42*a-b*, 42*b-b*) separated by the semi-circular cutout (40*a*, 40*b*). Having a first foot edge (42*a-a*, 42*b-a*) and a second foot edge (42*a-b*, 42*b-b*) created in this manner improves the stability of the table 10 and reduces potential wobble.

The portable table assembly 10 is advantageously assembled with only the components and parts as described above. In particular, the down-vertical notches (26*a-a*, 26*a-b*, 26*b-a*, 26*b-b*) of the first rail 14*a* and second rail 14*b* interlock with the up-vertical notches (32*a-a*, 32*a-b*, 32*b-a*, 32*b-b*) of the end panels (16*a*, 16*b*) such that the first rail 14*a* and second rail 14*b* horizontally traverse between and connect the end panels (16*a*, 16*b*). More specifically, the first down-vertical notch 26*a-a* of the first rail 14*a* interlocks with the first up-vertical notch 32*a-a* of the first end panel 16*a*, and the second down-vertical notch 26*a-b* of the first rail 14*a* interlocks with the first up-vertical notch 32*b-a* of the second end panel 16*b*. Likewise, the first down-vertical notch 26*b-a* of the second rail 14*b* interlocks with the second up-vertical notch 32*a-b* of the first end panel 16*a*, and the second down-vertical notch 26*b-b* of the second rail 14*b* interlocks with the second up-vertical notch 32*b-b* of the second end panel 16*b*. Therefore, the first rail 14*a* and second rail 14*b* are parallel and traverse horizontally between the two end panels (16*a*, 16*b*). The third rail 14*c* also traverses horizontally between and connects and further stabilizes the pair of end panels (16*a*, 16*b*). The first end portion of the third rail 14*c* slides through the closed slot 36*a* of the first end panel 16*a* where the first down-vertical notch 26*c-a* at the first end portion interlocks with the closed slot 36*a* (by sliding down on the bottom portion of the closed slot 36*a*). The opposing end of the third rail 14*c* slides through the closed slot 36*b* of the second end panel 16*b* where the second down-vertical notch 26*c-b* on the opposing end portion interlocks with the closed slot 36*b* of the second end panel 16*b*. Therefore, the third rail 14*c* is parallel with the first rail 14*a* and second rail 14*b*, and traverses between and further connects and stabilizes the pair of end panels (16*a*, 16*b*). Once the rails (14*a*, 14*b*, 14*c*) are assembled to the end panels (16*a*, 16*b*), the tabletop 12 may be deployed and laid atop at least one of the first rail 14*a*, second rail 14*b*, and the top edges (30*a*, 30*b*) of the end panels (16*a*, 16*b*) as shown in FIG. 1A. After which, the portable table assembly 10 is completed, stable, and ready for use. It should be appreciated therefore, that the table 10 is easily assembled, with no extra-hardware needed for assembly. The table 10 is just as easily disassembled for portability and storage.

Figure 5A:
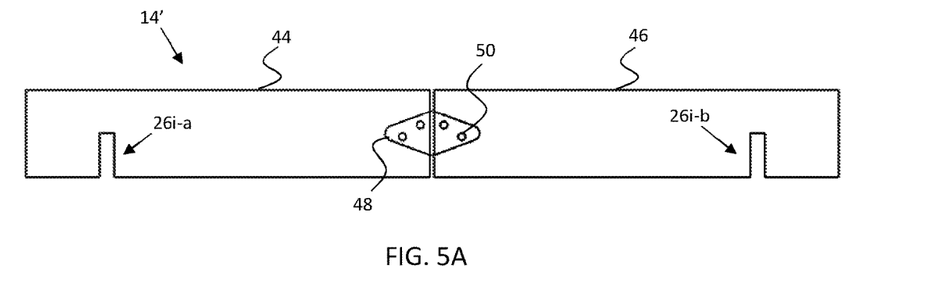
Figure 5B:
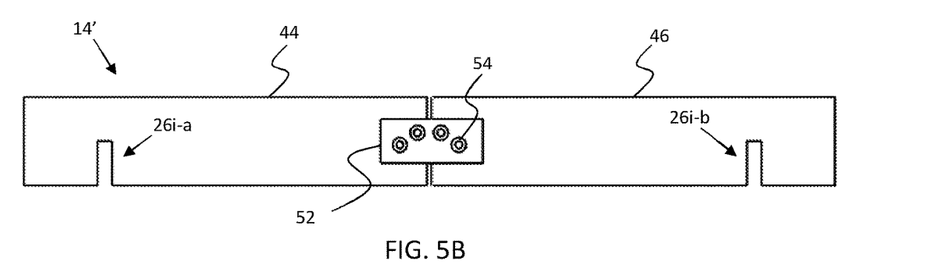

In many situations, it is desirous to disassemble the table 10 and place the tabletop 12, rails (14*a*, 14*b*, 14*c*), and end panels (16*a*, 16*b*) in a carrying case for transport. The carrying case is preferably sized to receive all of the components of the table 10. Since the rails (14*a*, 14*b*, 14*c*) are the longest component of the table 10, the carrying case therefore needs to accommodate the size of the rails (14*a*, 14*b*, 14*c*), which depending on the actual length of the rails (14*a*, 14*b*, 14*c*) would make the carrying case and the portability of the table 10 quite cumbersome. Therefore, in a particular embodiment, the table 10 includes three folding elongated horizontal rails that replace the aforementioned horizontal rails (14*a*, 14*b*, 14*c*). With reference to FIGS. 5A and 5B, an example of a folding elongated horizontal rail 14' is shown, where FIG. 5A depicts a front elevation view thereof, and FIG. 5B depicts a rear elevation view thereof. Each folding rail 14' includes the two down-vertical notches (26*i-a*, 26*i-b*, where i=a, b, or c) to interlock with the up-vertical notches (32*a-a*, 32*a-b*, 32*b-a*, 32*b-b*) and closed slots (36*a*, 36*b*) of the end panels (16*a*, 16*b*) as described above. The folding elongated rails 14' further include a first half horizontal portion 44 connected to a second half horizontal portion 46 by a hinge 48 to permit the folding rail 14' to fold half-wise for storage/transport and deploy for assembly. The hinge 48 is assembled to one side (e.g., a front side) of the first half horizontal portion 44 and second half horizontal portion 46 with a first set of fastening elements 50 (e.g., screws, nails, rivets). On an opposing side of the foldable rail 14', as shown in FIG. 5B, is a disengageable reinforcement 52. The reinforcement 52 reinforces the structure of the foldable rail 14' when the rail 14' is in a deployed state and also prevents the foldable rail 14' from buckling/folding. The reinforcement 52 is deemed 'disengageable' in that the reinforcement 52 may be engaged to reinforce the rail 14' for stability during assembly/use, and disengaged to permit the rail 14' to fold for storage/transport. The reinforcement 52 may be in the form of a reinforcement block as shown in FIG. 5B. The reinforcement block traverses the connection between the first half horizontal portion 44 and the second half horizontal portion 46. In some embodiments, the reinforcement block is assembled to the rail 14' by a second set of fastening elements 54, where the fastening elements 54 are capable of being manually tightened and untightened (e.g., screws tightened/untightened by wing-nuts) to quickly engage and disengage the reinforcement 52. In a specific embodiment, the first set of fastening elements 50 for assembling the hinge 48 and the second set of fastening elements 54 for assembling the reinforcement 52 are one in the same where the user can quickly assemble the hinge 48 and the reinforcement 52 at the same time and with the same hardware. This reduces overall manufacturing costs and simplifies the assembly procedure. It should be appreciated, that the reinforcement 52 may be in other shapes or forms and reinforce the rail 14' by other mechanisms (e.g., a latch, a clasp, or a clamp).

In specific embodiments, the tabletop 12, the elongated rails (14a, 14b, 14c), the end-panels (16a, 16b), and reinforcement 52 (if present) are preferably made of wood due to woods availability, durability, recyclability, and aesthetic appeal. The wood may be stained and treated to prevent water damage and provide a nice finishing look. The type of wood may vary depending on user preference and the use/occasion. For example, if the table is used in a dining room, a hardwood such as walnut, maple, or oak may be preferred, whereas if the table is used as an outdoor picnic table, a composite wood may suffice. However, it should be appreciated that other materials such as polymers and metals are perfectly suitable, albeit with increased cost and manufacturing complexity.

Figure 6:
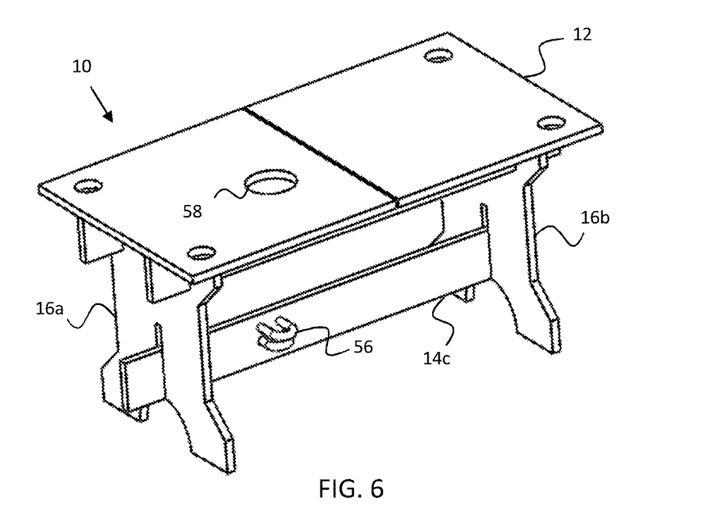
FIG. 6 is a perspective of the portable table assembly having a U-bolt for receiving and securing an umbrella shaft in accordance with embodiments of the invention.

With reference to FIG. 6, the portable table assembly 10 may further include one or more U-bolts 56 assembled to at least one of the elongated rails (14a, 14b, 14c) and/or the end panels (16a, 16b) to receive an umbrella shaft. The tabletop 12 may include a hole 58 in which the shaft of the umbrella may fit therethrough, which is then received and firmly held by the U-bolt(s) 56. Again, the U-bolt(s) 56 is preferably assembled to the elongated rails (14a, 14b, 14c, 14') and/or end panels (16a, 16b) using a manual method (e.g., hand screwing, bolting, wingnuts) without the need for additional tools.

The portable table assembly 10 may further include tabletop securement features (not shown). The tabletop securement features secure the tabletop 12 to at least one of the top edges (30a, 30b) of the end panels (16a, 16b) and/or the top surfaces of the first and second elongated rails (14a, 14b). The securement features may be in form of a block that connects the tabletop 12 and the end panels (16a, 16b) and/or first and second elongated rails (14a, 14b) to prevent the tabletop 12 from slipping. In other embodiments, the securement feature is in the form of an adhesive, fastening element, one or more latches, or a grip. For example, a rubber grip may be positioned between the tabletop 12 and at least one of: the top edges (30a, 30b) of the end panels (16a, 16b); and/or the top surfaces of the first and second rail (14a, 14b, 14'). In another example, one or more latches (e.g., hook and eyelet) are used to secure the tabletop 12 to the end panels (16a, 16b) and/or rails (14a, 14b) to prevent the tabletop 12 from separating therefrom due to one or more external forces (e.g., wind).

Figure 7A:
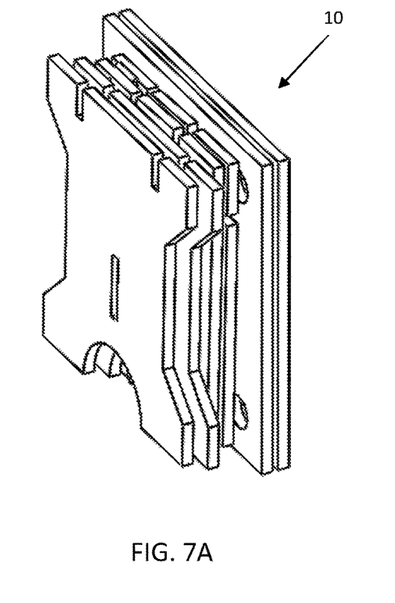
FIG. 7A depicts the portable table assembly in a collapsed state and ready for storage/transport in accordance with embodiments of the invention.
Figure 7B:
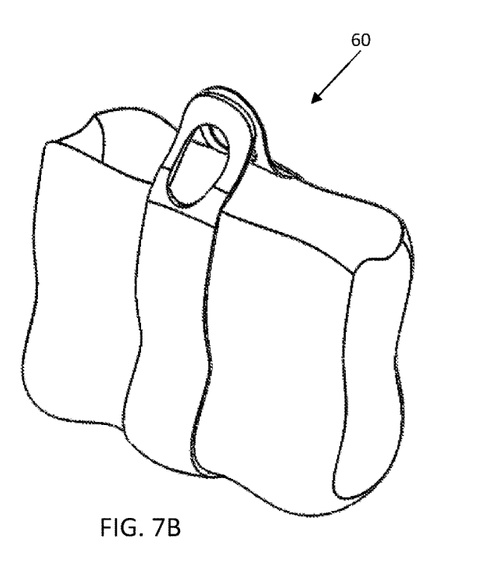
FIG. 7B depicts a carrying bag for transporting the portable table assembly in accordance with embodiments of the invention.

With reference to FIGS. 7A and 7B, the portable table assembly 10 is shown collapsed and ready for storage/transport in a carrying bag 60. The portable table assembly 10 as shown in FIG. 7A includes the folding elongated rails 14' to illustrate how compact the components of the table 10 can be when disassembled and ready for storage/transport. In particular embodiments, the carrying bag 60 includes one or more individual compartments to receive and organize one or more of the components of the table 10. For example, the carrying bag 60 may include a first pocket to receive the elongated rails 14', a second pocket to receive the end panels (16a, 16b), a third pocket to receive the tabletop 12, and a fourth pocket to receive any additional components (e.g., reinforcement 52, U-bolt(s) 56, and fastening elements). It should be appreciated that any combination of one or more of the above pockets may be present in the carrying bag 60.

In specific embodiments, the carrying bag has a height of 30±5 inches, a width of 30±5 inches, and a thickness of 10±5 inches.

Method of Manufacture

Figure 8:
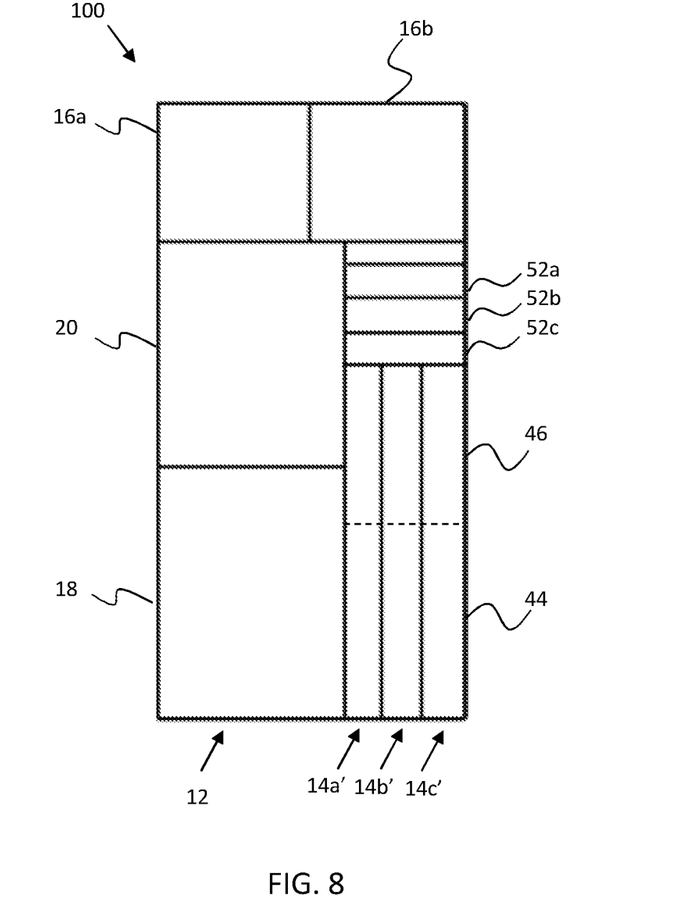
FIG. 8 depicts a single sheet of material for manufacture the components of the portable table assembly in accordance with embodiments of the invention.

The portable tabletop assembly 10 is readily manufactured with methods known in the art. However, a specific inventive embodiment of a method for manufacturing the tabletop 12, elongated rails (14a, 14b, 14c), and pair of end panels (16a, 16b) of the tabletop assembly 10 is also provided herein. The method of manufacture is particularly advantageous as a "do-it-yourself" (DIY) project in which any capable person may easily manufacture one or more of the tables in less than a day. With reference to FIG. 8, a single sheet of material 100 is provided. A template guide having guide features is provided where the guide features have geometries and dimensions corresponding to the geometries and dimensions of the tabletop 12, the elongated rails (14a', 14b', 14c'), and the pair of end panels (16a, 16b). For example, the template features may be stencils having channels and/or a perimeters in which a user can outline therein or around. The template guide thus permits a user to mark an outline of the tabletop 12, the elongated rails (14a, 14b, 14c), and the pair of end panels (16a, 16b) on the single sheet of material 100. The template guide may include additional guide features to permit the user to mark an outline for additional components such as the reinforcements (52a, 52b, 52c) and the securement features. The tabletop 12, elongated rails (14a', 14b', 14c'), and end panels (16a, 16b) are then cut from the single sheet of material 100 and the up-vertical notches (32a-a, 32a-b, 32b-a, 32b-b) and down-vertical notches (26a-a, 26a-b, 26b-a, 26b-b, 26c-a, 26c-b) are created in the end panels (16a, 16b) and elongated rails (14a', 14b', 14c'), respectively. One or more hinges (22a, 22b, 48), one or more set of fastening elements (50, 54), and a carrying bay 60 may also be provided. The hinges (22a, 22b, 48) and fastening elements (50, 54) are assembled to at least one of the tabletop 12 and elongated horizontal rails (14a', 14b', 14c') after which the tabletop 12, elongated rails (14a', 14b', 14c'), and end panels (16a, 16b) are then packaged in the carrying bag 60 for storage/transport. In some embodiments, the template guide has the same dimensions as the single sheet of material 100. The template guide may be malleable or foldable for storage and temporarily adhere to sheet of material 100 while a user makes the outlines. In a specific embodiment, the single sheet of material is made of wood and has dimensions of 4.0±0.5 feet by 8.0±0.5 feet with a thickness ranging from 0.5 inches to 1.0 inches. This particular dimension is advantageous as most sheets of composite wood are sold at department stores in this dimension and therefore only a single sheet of this wood is required to create the tabletop 12, the elongated rails (14a', 14b', 14c'), and the pair of end panels (16a, 16b) at the specific dimensions described in the embodiments above.

A Do-It-Yourself kit is also provided herein to permit any capable person of manufacturing the table assembly 10 according to the steps above. The DIY kit includes: a) a template guide having guide features with geometries and dimensions that correspond to the geometries and dimensions of the tabletop 12, the elongated rails (14a, 14b, 14c), and the pair of end panels 916a, 16b); b) at least one hinge (22a, 22b, 48); c) a plurality of fastening elements (50, 54); d) a carrying bag 60; and e) a set of instructions for creating the portable tabletop assembly 10. The kit may further include the single sheet of material 100, while in other embodiments the user is instructed to purchase the sheet of material 100 separately.

Other Embodiments

While at least one exemplary embodiment has been presented in the foregoing detail description, it should be appreciated that a vast number of variations exist. It should also be appreciated that the exemplary embodiment or exemplary embodiments are only examples, and are not intended to limit the scope, applicability, or configuration of the described embodiments in any way. It should be understood that various changes may be made in the function and arrangement of elements without departing from the scope as set forth in the appended claims and the legal equivalents thereof.

What is claimed is:

1. A portable table assembly for indoor and outdoor use, comprising:
   a tabletop;
   a first elongated horizontal rail, a second elongated horizontal rail, and a third elongated horizontal rail, each elongated rail having a down-vertical notch positioned at opposing ends of the elongated rails; and
   a pair of parallel spaced end panels, each end panel being a planar body having a top edge, each top edge having two up-vertical notches positioned symmetrically about a central-vertical axis of the end panels, and a closed vertical slot positioned within the body along the central-vertical axes, and wherein the closed vertical slot has a vertical dimension at least twice as large as a vertical dimension of the two up-vertical notches; and
   wherein, when the portable table is assembled, the down-vertical notches on the first elongated rail and second elongated rail interlock with the two up vertical notches on the top edges of the end panels such that the first elongated rail and second elongated rail horizontally traverse between and connect the pair of end panels, and wherein each down vertical notch of the third elongated rail interlock over a bottom end of the closed vertical slots of the end panels such that the third rail horizontally traverses between and further connects and stabilizes the pair of end panels, and wherein the tabletop rests atop at least one of the top edges of the end panels and a top surface of the first rail and the second rail to complete the portable table assembly.

2. The portable table assembly of claim 1 wherein each end panel further comprises a foot edge opposing the top edge, wherein a semi-circular cutout is situated at the central-vertical axis of the end panels and along the foot edge to form a first foot edge and a second foot edge separated by the semi-circular cutout.

3. The table assembly of claim 1 wherein each elongated horizontal rail comprises a first horizontal half portion connected to a second horizontal half portion by a hinge to permit the elongated rails to half-wise fold for storage and deploy for assembly.

4. The table assembly of claim 3 wherein each hinge connecting the first horizontal portion and second horizontal portion of each rail is assembled thereto by a first set of fastening elements.

5. The table assembly of claim 4 wherein each elongated horizontal rail further comprises a disengageable reinforcement positioned on an opposing side of the rail relative to the hinge, said reinforcement in an engaged state reinforces the rail when the rail is in a deployed state for assembly and in a disengaged state when the rail is to be half-wise folded.

6. The table assembly of claim 5 wherein the disengageable reinforcement is a reinforcement block assembled to the opposing side of each rail with a second set of fastening elements and wingnuts to permit a user to manually assemble and disassemble the reinforcement block without additional tools.

7. The table assembly of claim 6 wherein the first set of fastening elements and second set of fastening elements are the same set of fastening elements.

8. The table assembly of claim 3 wherein the tabletop, each first horizontal portion of each elongated rail, each second horizontal portion of each elongated rail, and the pair of end panels are made of wood.

9. The portable table assembly of claim 1 wherein the tabletop is half-wise foldable having a first half portion connected to a second half portion by a hinge to permit the tabletop to half-wise fold for storage and deploy for assembly.

10. The table assembly of claim 9 further comprising a tabletop securement feature positioned between at least one of the tabletop, the first rail, and the second rail for securing the tabletop thereto, wherein the tabletop securement feature is in the form of a fastening element, an adhesive, a block, or a grip.

11. The table assembly of claim 10 wherein the tabletop further comprises a plurality of cup holders in the form of circular cutouts or circular indents.

12. The table assembly of claim 11 further comprising one or more U-bolts for assembly to at least one of the elongated horizontal rails and end panels to receive an umbrella shaft.

13. A method of manufacturing the tabletop, elongated rails, and pair of end panels of claim 1, the method comprising:
   providing a single sheet of material;
   providing one or more template guides having guide features with geometries and dimensions to aid in the creation of the tabletop, the elongated rails, and the pair of end panels;
   marking an outline of the tabletop, the elongated rails, and the pair of end panels on the single sheet of material using the one or more template guides;
   cutting the tabletop, the elongated rails, and the end panels from the single sheet of material; and
   creating the up-vertical notches and the down-vertical notches.

14. The method of claim 13 further comprising:
   providing one or more hinges, one or more sets of fastening elements, and a carrying bag;
   assembling the one or more hinges to at least one of the tabletop and elongated horizontal rails; and
   packaging the tabletop, elongated horizontal rails, and end panels into the carrying bag.

15. The method of claim 14 wherein the template guide has substantially the same dimensions as the single elongated sheet of material.

16. The method of claim 14 wherein the single sheet of material is made of wood and has dimensions of 4.0±0.5 feet by 8.0±0.5 feet.

17. A do-it-yourself kit for performing the method of claim 13, comprising:
   a template guide having guide features with geometries and dimensions to aid in the creation of the tabletop, the elongated rails, and the pair of end panels;
   at least one hinge;
   a plurality of fastening elements;
   a carrying bag; and
   a set of instructions for creating the portable tabletop assembly.

18. The kit of claim 17 further comprising a single sheet of material.

19. The kit of claim 18 wherein the single elongated sheet of material is made of wood and has dimensions of 4.0±0.5 feet by 8.0±0.5 feet.

* * * * *